W. C. HOWARD.
TIRE PATCH.
APPLICATION FILED APR. 28, 1913.
1,096,535.
Patented May 12, 1914.
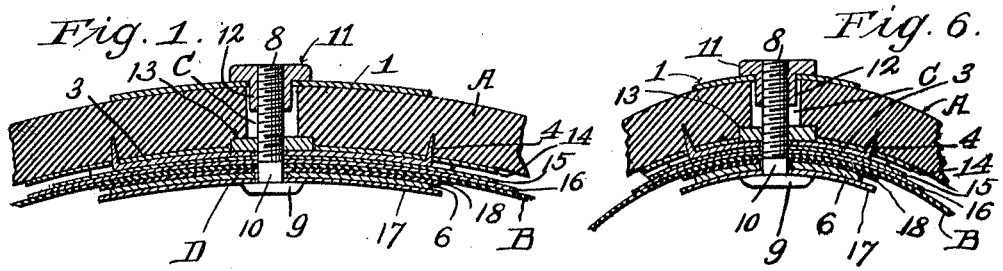
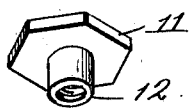
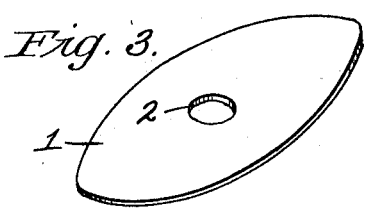
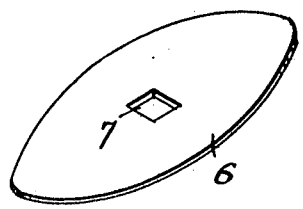
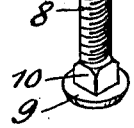
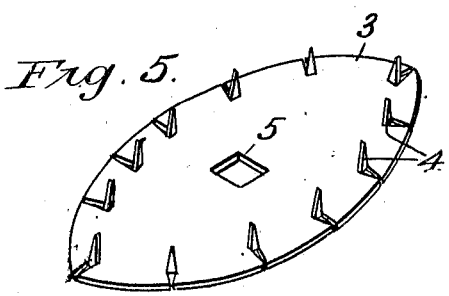
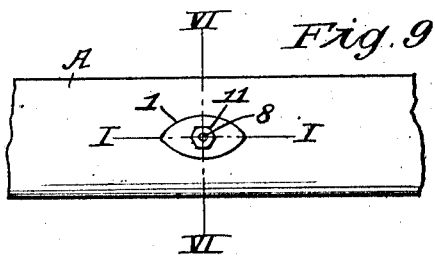
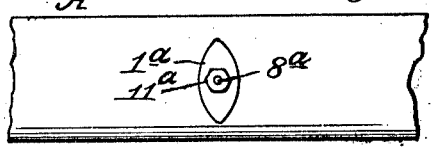
Witnesses:
R. E. Hamilton
F. G. Fischer
Inventor:
W. C. Howard,
By his Attorney
F. G. Fischer

UNITED STATES PATENT OFFICE.

WILLIAM C. HOWARD, OF KANSAS CITY, MISSOURI.

TIRE-PATCH.

1,096,535.

Specification of Letters Patent.

Patented May 12, 1914.

Application filed April 28, 1913. Serial No. 764,014.

*To all whom it may concern:*

Be it known that I, WILLIAM C. HOWARD, a citizen of the United States, residing at Kansas City, in the county of Jackson and State of Missouri, have invented certain new and useful Improvements in Tire-Patches, of which the following is a specification.

My invention relates to improvements in pneumatic-tire patches, and my object is to provide a simple device of this character which may be employed to advantage in closing punctures too large to be sealed with the rubber plugs usually employed for that purpose.

The invention is particularly adapted for use in emergencies arising from punctures or blow-outs while on the road, and may be readily applied with the aid of only an ordinary wrench.

The device embodies means for closing punctures both in the inner and outer tubes of the tire, and in order that the invention may be fully understood, reference will now be made to the accompanying drawing, in which—

Figure 1 is a longitudinal section on line I—I of Fig. 9, of the outer portion of a tire with my patch applied thereto. Fig. 2 is a detail perspective of a nut employed in holding the patch in place. Fig. 3 is a detail perspective of an outer clamping-plate constituting part of the device. Fig. 4 is a nut employed in holding several parts of the device together. Fig. 5 is a detail perspective of a toothed-plate forming an important feature of the device. Fig. 6 is a cross section on line VI—VI of Fig. 9. Fig. 7 is a detail perspective of an inner clamping-plate. Fig. 8 is a detail perspective of a bolt used in securing the several parts of the patch in place. Fig. 9 is a broken plan view of a tire with the patch applied thereto. Fig. 10 is a modified form of patch applied to a tire.

Referring now in detail to the parts disclosed by the drawing, A designates the outer tube and B the inner tube of an automobile tire, said tubes being punctured at C and D, respectively.

1 designates an outer clamping-plate having a central opening 2 therein.

3 designates an inner clamping-plate having teeth 4 struck upward from the margin thereof, and a rectangular central opening 5.

6 designates an inner clamping-plate having a rectangular central opening 7.

As shown on Figs. 1 and 6, the clamping-plates are curved to fit the contour of the tire when the same is inflated.

8 designates a bolt having a head 9 at one end and a rectangular shoulder 10 adjacent said head.

11 designates a nut having a central threaded opening and a threaded tubular extension 12 to receive the threaded portion of bolt 8.

13 designates a nut adapted to be screwed upon bolt 8. As shown the nuts 11 and 12 are thinner and wider than the customary nuts. This is for the purpose of covering a comparatively wide surface without taking up much room lengthwise of the bolt 8.

14, 15, 16 and 17 designate, respectively, sheets of canvas or other suitable material of substantially the same shape as the plates 1, 3 and 6, which as shown are of elliptical form, although I do not restrict myself to this particular form as it is obvious that plates of oval or other form may be employed to advantage.

18 designates a soft or raw rubber sheet applied to one side of plate 6.

In practice, the canvas sheet 17, the inner plate 6 and its rubber sheet 18 are slipped upon the bolt 8 in the order mentioned after which said bolt is placed through the puncture D, in the inner tube B. The canvas sheets 16 and 15, and the toothed-plate 3, are then slipped upon the bolt 8, in the order named after which the nut 13 is placed upon the bolt 8, and screwed up against the toothed-plate 3 until the whole is firmly bound together. The canvas sheet 14 is then slipped over nut 13 and the teeth 4, until it rests against the adjacent surface of plate 3. The threaded end of bolt 8 is next placed through the puncture C in the outer tube A, and the outer clamping-plate 1 is slipped over the end of bolt 8 and against said outer tube A, after which nut 11 is screwed upon the bolt until all of the parts are firmly clamped together. The screwing up of nut 11 upon bolt 8 embeds teeth 4 in the tube A, so that the material surrounding the puncture C is reliably held from spreading and allowing said puncture to enlarge when the tire is inflated and subjected to heavy pressure incident to traveling over a road.

The rubber and canvas sheets prevent the air from escaping around the bolt 8, or between the tire tubes and the clamping-plates 3 and 6, and also prevent such wear to the tubes as would occur if said clamping-plates came directly in contact therewith. The clamping-plates are made in different sizes to accommodate large or small punctures, and also of different curvatures to fit the exposed parts of different sized tires.

In the modified form disclosed by Fig. 10, the parts are the same as in the preferred form except they have shorter radii to close a puncture extending transversely of the tire instead of longitudinally. Referring in detail to the exposed parts of said modified form, A¹ designates the tire, 1ᵃ the outer clamping-plate, 8ᵃ the bolt, and 11ᵃ the outer nut.

Having thus described my invention, what I claim and desire to secure by Letters Patent is:

1. In combination with a tire having inner and outer tubes, a plate to engage the outer surface of the outer tube, a plate to engage the inner surface of the outer tube and the adjacent surface of the inner tube, a plate to engage the inner surface of the inner tube, and means extending through openings in said tubes to firmly draw the plates against the adjacent surfaces of the tubes.

2. In combination with a tire having inner and outer tubes, a plate to engage the outer surface of the outer tube, a toothed-plate to engage the inner surface of the outer tube and the adjacent surface of the inner tube, a plate to engage the inner surface of the inner tube, a bolt extending through the tubes and said plates, a nut threaded on said bolt to firmly draw the inner tube and adjacent plates firmly together, and a nut engaging the outer end of said bolt and the outer plate to draw the whole firmly together and embed the teeth in the outer tube.

3. In combination with a tire having inner and outer tubes, a plate to engage the outer surface of the outer tube, a flexible sheet placed against the inner surface of said outer tube, a toothed-plate placed against said flexible sheet, a flexible sheet interposed between said toothed-plate and the outer surface of the inner tube, a flexible sheet placed against the inner surface of the inner tube, a clamping plate placed against the last-mentioned sheet, and means to draw the whole firmly together and embed the teeth in the outer tube.

In testimony whereof I affix my signature, in the presence of two witnesses.

WILLIAM C. HOWARD.

Witnesses:
  F. G. FISCHER,
  L. J. FISCHER.

---

Copies of this patent may be obtained for five cents each, by addressing the "Commissioner of Patents, Washington, D. C."